(12) United States Patent
Ushijima

(10) Patent No.: US 7,680,813 B2
(45) Date of Patent: Mar. 16, 2010

(54) INFORMATION MANAGEMENT SYSTEM

(75) Inventor: Kazutomo Ushijima, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 701 days.

(21) Appl. No.: 11/407,971

(22) Filed: Apr. 21, 2006

(65) Prior Publication Data

US 2006/0259813 A1    Nov. 16, 2006

(30) Foreign Application Priority Data

May 12, 2005    (JP) .............................. 2005-139228

(51) Int. Cl.
*G06F 17/00* (2006.01)
(52) U.S. Cl. ...................... 707/102; 707/100; 707/101; 707/104.1; 707/103 R; 707/3
(58) Field of Classification Search .......... 707/100–102
See application file for complete search history.

(56) References Cited

U.S. PATENT DOCUMENTS

2006/0206440 A1 * 9/2006 Anderson et al. ........... 705/500

OTHER PUBLICATIONS

Rajeev Motwani, et al. "Query Processing, Resource Management, and Approximation in a Data Stream Management System", 6 pages, Jan. 2003.
Venky Harinarayan, et al. "Implementing Data Cubes Efficiently" pp. 205-816, Jun. 1996.
H. Garcia-Molina, et al. "Database System Implementation" pp. 604-613, Jun. 11, 1999.

* cited by examiner

*Primary Examiner*—Sana Al-Hashemi
(74) *Attorney, Agent, or Firm*—Brundidge & Stanger, P.C.

(57) ABSTRACT

An information management system for modifying action of system in accordance with previously set policy with reference to metadata and/or log data accompanying data to be managed makes efficient information lifecycle management by reducing the grading of the data to be managed and increasing the expressive power of the definable policy while suppressing increase of the amount of necessary metadata and/or log data. The ontology for defining the relation between terms referred in business level is introduced and analyzed together with the policy, so that the range necessary for acquisition of information can be clearly decided to thereby reduce time and labor required for modification of setting and the operation management cost and optimize necessary resources.

16 Claims, 12 Drawing Sheets

FIG. 7

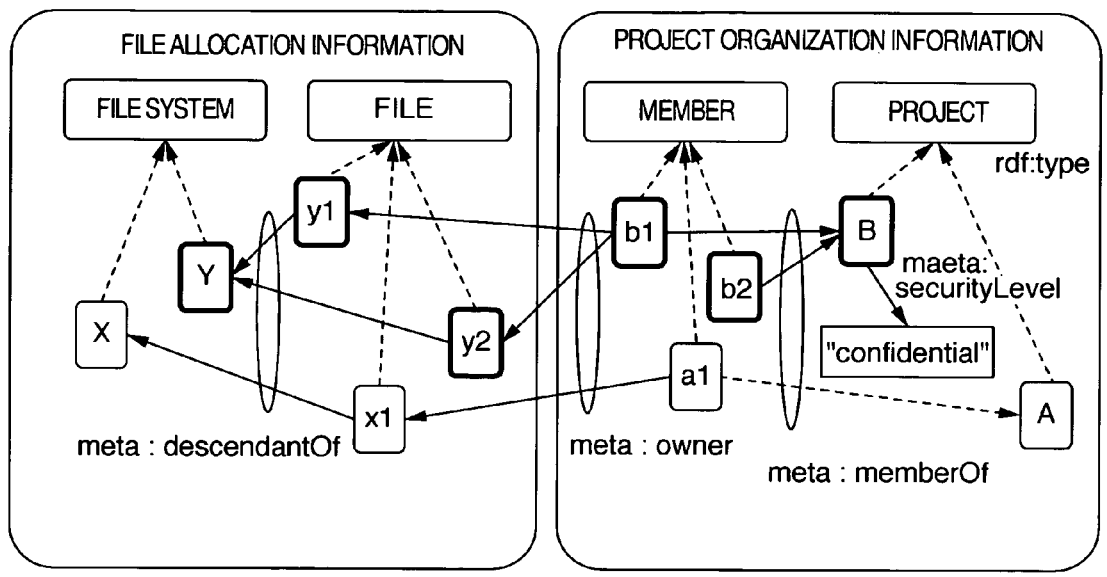

FIG. 8

POLICY

| # | CONDITION PART | COMMAND PART |
|---|---|---|
| 1 | SELECT ?dataitem<br>WHERE<br>(?project,meta:securityLevel, "confidential"),<br>(?dataitem,im:belongsTo, ?project),<br>(?dataitem,rdf:type, "file"),<br>(?dataitem,meta:accesshistory,?acclog),<br>(?acclog, meta:accesstime,?acctime)<br>AND<br>?acctime >TODAY-1WEEK<br>USING ilm FOR<br><http://ilm//ontology.rdf#> | Set accesslog On dataitem |

FIG. 9A

CONDITION PART TRANSFORMATION ONTOLOGY

| # | CONDITION PART |
|---|---|
| 1 | (?dataitem, ilm:belongsTo,?project)<br>↓<br>(?member, ilm:belongsTo,?project)<br>(?dataitem,ilm:owns,?member) |
| 2 | (?member,ilm:belongsTo,?project)<br>↓<br>(?member, meta:memberOf,?project) |
| 3 | (?dataitem, ilm:owner,?member)<br>↓<br>(?dataitem, meta:owner,?member) |

FIG. 9B

COMMAND PART TRANSFORMATION ONTOLOGY

| # | COMMAND PART |
|---|---|
| 1 | Set accesslog On ?dataitem<br>(?dataitem,rdf:type,"file")<br>↓<br>Set accesslog On ? filesystem<br>(?filesystem,rdf:type,"filesystem")<br>(?dataitem,meta:desendantOf, ?filesystem) |

FIG. 10A

EVALUABLE METADATA FOR FILE ALLOCATION INFORMATION

| # | EVALUABLE METADATA |
|---|---|
| 1 | meta:owner |
| 2 | meta:desendantOf |
| 3 | meta:sccesshistory |
| 4 | meta:accesstime |

FIG. 10B

EVALUABLE METADATA FOR PROJECT ORGANIZATION INFORMATION

| # | EVALUABLE METADATA |
|---|---|
| 1 | meta:securityLevel |
| 2 | meta:memberOf |

FIG. 10C

SYSTEM EVALUABLE COMMAND

| # | EXECUTABLE METADATA |
|---|---|
| 1 | Set accesslog On?filesystem |
| 2 | (?filesystem,rdf:type,"filesystem") |

FIG. 11A

METADATA FOR FILE ALLOCATION

FILE SYSTEM INFORMATION

| # | MOUNT POINT | FILE SYSTEM TYPE | AVAILABILITY OF ACCESS LOG |
|---|---|---|---|
| 1 | /X | Local FS | OK |
| 2 | /Y | CIFS | OK |

FIG. 11B

FILE INFORMATION

| # | FILE NAME | TYPE | OWNER | CREATE DATE | LAST ACCESS DATE |
|---|---|---|---|---|---|
| 1 | /X/x1 | DOCUMENT | a1 | 2005.2.9 | 2005.2.9 |
| 2 | /Y/y1 | DOCUMENT | b1 | 2005.2.3 | 2005.2.5 |
| 3 | /Y/y2 | IMAGE | b1 | 2005.2.5 | 2005.2.5 |

FIG. 12A

METADATA FOR PROJECT ORGANIZATION

PROJECT INFORMATION

| # | PROJECT NAME | ACTIVITY | SECURITY CLASS |
|---|---|---|---|
| 1 | A | CUSTOMER SATISFACTION | |
| 2 | B | SALES PROMOTION | SECRET |

FIG. 12B

MENBER INFORMATION

| # | NAME | PROJECT NAME | SPECIALTY |
|---|---|---|---|
| 1 | a1 | A | marketing |
| 2 | b1 | B | planning |
| 3 | b2 | B | accounting |

_

INFORMATION MANAGEMENT SYSTEM

INCORPORATION BY REFERENCE

The present application claims priority from Japanese application JP 2005-139228 filed on May 12, 2005, the content of which is hereby incorporated by reference into this application.

BACKGROUND OF THE INVENTION

The present invention relates to an information lifecycle management system for deciding a data management method in accordance with the value of data in business and more particularly to a system which previously defines a group of policy for associating the classification standard of data to be managed with the data management method applied to classified data and decides the management system of the data to be managed in accordance with the contents of the defined policy.

Generally, the information management system for realizing the information lifecycle management named ILM pays attention to the fact that the value in business of data to be managed is varied temporally in a series of lifecycle from generation to abandonment of the data and selects a proper data management method in accordance with the value in business at the moment on the basis of the previously designated policy to be applied, so that the data management cost in the whole system is reduced.

For example, when the policy that transaction data related to promising customers having a high utilization frequency in a last one month is stored in a disk apparatus having the high reliability is defined, the utilization log concerning individual customers is referred to judge the importance degree thereof while collating it with the policy and relevant transaction data is automatically moved into a disk apparatus having different reliability and byte unit cost, so that the total cost (containing an apparatus cost and an operation cost) of the system is reduced. The value in business of the data to be managed that is varied with the elapse of time is judged with reference to metadata accompanying the data to be managed and the contents of log data to be stored and various data management methods having different implementation costs are automatically used to thereby reduce the data management cost required in the whole system.

The policy that defines the application principle of the data management method to the data to be managed includes a condition part for narrowing down data to be operated in modification operation of the data management method and a command part for instructing operation contents. When the information lifecycle management is applied to a practical system, it is insufficient to describe only simple metadata such as data preparation time information and last access time information obtained from a file system or the like in the condition part of the policy and there is strong need that it is desired that the concept of business level such as the section of customers and the business classification of documents is used to set the condition.

Generally, as the granularity of the data to be managed is more detailed and the policy having more complicated conditions can be described, the data management can be realized minutely and efficiently. However, the unit of management of data is subdivided and the description range of the policy and the range of metadata and/or log data required to be acquired for individual data to be managed is expanded, so that the implementation cost of the information lifecycle management is increased.

The following are prior-art techniques deemed to be utilized for making it possible to define the policy at the business level and for reducing the collection and management cost of metadata and/or log data in realization of the information lifecycle management.

Rajeev Motwani, Jennifer Widom, Arvind Arasu, Brian Babcock, Shivnath Babu, Mayur Datar, Gurmeet Singh Manku, Chris Olston, Justin Rosenstein, Rohit Varma: "Query Processing, Approximation, and Resource Management in a Data Stream Management System", CIDR 2003 discloses the technique that window conditions (restriction for the number of data resources, data generation time and the like) are set to data resources to be retrieved and the range of data to be retrieved is clearly designated for each query to be restricted. This technique is named "Stream DB System".

Venky Harinarayan, Anand Rajaraman, Jeffrey D. Ullman: "Implementing Data Cubes Efficiently" SIGMOD Conference 1996: pp. 205-216 discloses the technique that a part of the common portion of the retrieval processing expected to be frequently inputted is executed in advance and the result thereof is held to thereby improve the retrieval efficiency. This technique is named "Materialized View System".

Hector Garcia-Molina, Jeffery D. Ullman, Jennifer Widom, "Database System Implementation", pp. 605-612 discloses the technique that a data format transformation program named "Wrapper" and a program named "Mediator" for generating data corresponding to higher-ranking concept from individual data are previously defined and the individual data is associated with the concept at business level to define the retrieval processing by using terms at business level. This technique is named "Wrapper and Mediator System".

Even in any of the above three systems, the contents of the query processing applied to data body to be retrieved are modified in accordance with the contents of query inputted in the system, although the data body itself is not influenced.

SUMMARY OF THE INVENTION

In the "stream DB system", the materialized view system" and the wrapper and mediator system" as described above, the contents of the query processing applied to the data body to be retrieved are modified in accordance with the contents of the query inputted in the system. However, even when any of the above-mentioned prior-art methods is applied to realization of the information lifecycle management, the management method of metadata/log data accompanying the data resource is not modified.

In the data management system which modifies action of system in accordance with previously set policy with reference to metadata and/or log data accompanying data to be managed, in order to realize more flexible and practical management, it is desired that the expressive power of the policy is increased by expanding the terms available in the definition of the policy and/or reducing the grading of the data to be managed. However, to this end, when the description of the policy is complicated and the amount of metadata and/or log data required to be stored is increased, the management cost is increased all the more.

Accordingly, it is an object of the present invention to realize efficient and flexible information lifecycle management while making the definition of the policy easy and suppressing increase of the management cost.

The range of metadata and/or log data required to be acquired is changed in accordance with the definition contents of the policy, although in the present invention the ontology for defining the correspondence relation between the terms at business level used in the description of the policy and the metadata and/or log data is introduced and analyzed together with the policy, so that the range necessary for acquisition of information can be clearly decided to make the definition of the policy easy and reduce the operation management cost.

In the present invention, setting concerning the management of metadata and/or log data accompanying the data resources is sometimes modified in accordance with the contents of the set policy and, for example, when reference to the log data is limited within the past one month, the log data older than the past one month is automatically deleted. In this manner, the system according to the present invention is largely different from the above-mentioned prior arts in that the management method of metadata/log data accompanying data resources is modified in order to realize the information lifecycle management.

In the information lifecycle management system in which management of resources is optimized on the basis of the previously defined policy, when complicated policy is to be defined or the number of resources to be managed is to be increased, the classification of metadata and/or log data required to be acquired is also enormous and the cost required for its acquisition is increased.

According to the present invention, the ontology for defining the correspondence relation between the terms at business level utilized when the policy is defined and metadata and/or log data accompanying the data to be managed is introduced to decide the acquisition range of metadata/log data while considering the acquisition possibility of metadata/log data and the executability of command, so that the following are attained:
1. The minimum acquisition conditions of metadata/log data required for implementation of the defined policy are decided and accordingly the efficient information lifecycle management can be realized.
2. The terms at business level can be used to define the policy and since the acquisition conditions of metadata and/or log data can be automatically changed by replacing the correspondence relation even when the definition of the conditions referred in the policy is changed, the definition of the policy can be made easy and the management cost can be reduced.

Other objects, features and advantages of the invention will become apparent from the following description of the embodiments of the invention taken in conjunction with the accompanying drawings.

BRIEF DESCRIPTION OF THE DRAWINGS

FIG. 7 is an RDF graph of file allocation information and project organization information in an application example of the embodiment;

FIG. 8 shows policy definition in the application example;

FIGS. 9A and 9B show ontology definition in the application example;

FIGS. 10A-10C show evaluable metadata/log data or applicable command definition in the application example;

FIGS. 11A and 11B show metadata for file allocation information in the application example;

FIGS. 12A and 12B show metadata for project organization information in the application example.

DESCRIPTION OF THE EMBODIMENTS

Figure 1:
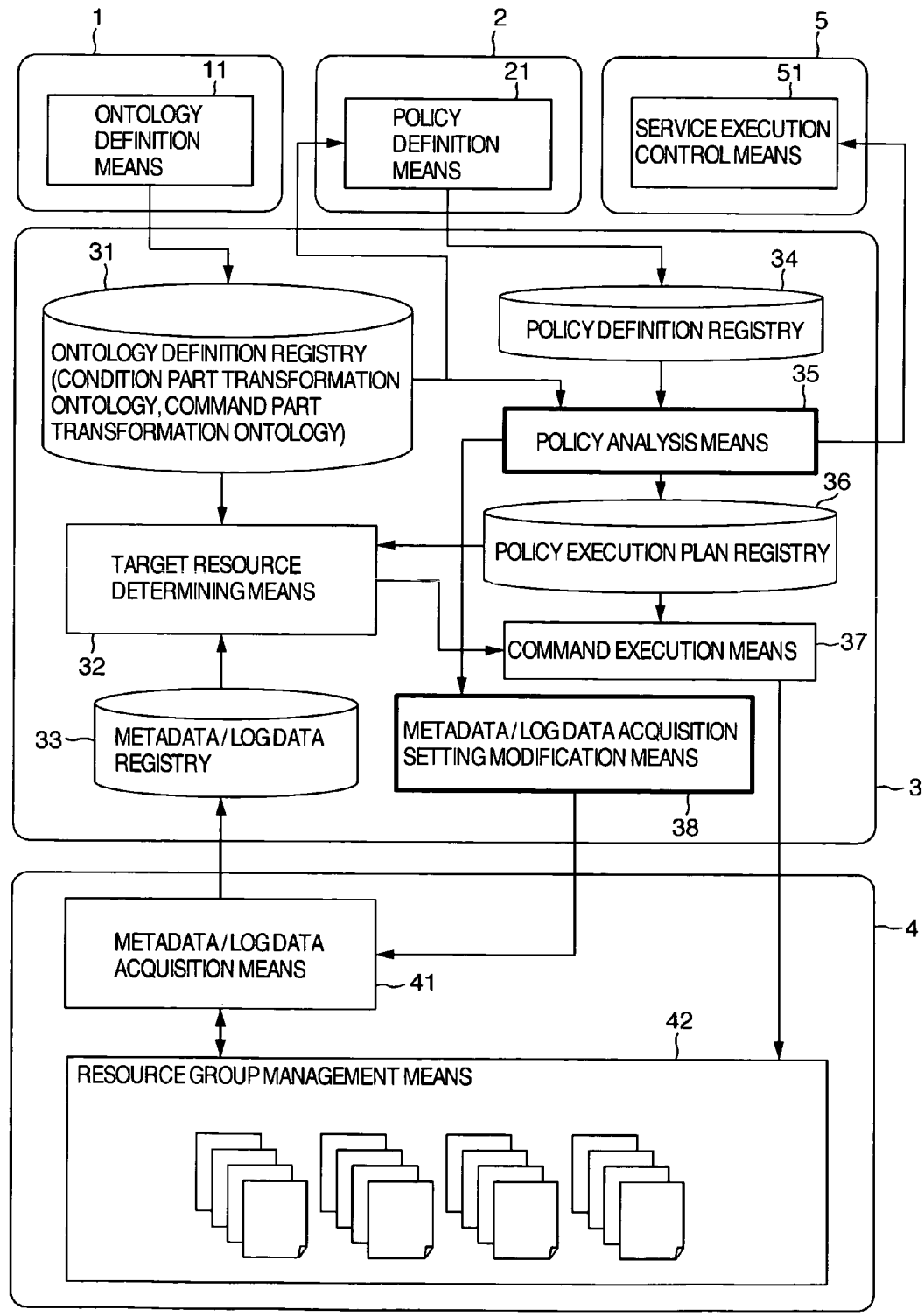
FIG. 1 is a block diagram schematically illustrating an information lifecycle management system according to the present invention.

FIG. 1 schematically illustrates an embodiment of an information lifecycle management system including a data management system according to the present invention. In the information lifecycle management system of the embodiment, the value of business data such as document files and mail to be managed is considered to be varied in accordance with a state of project or business and a data management method according to the value at the moment is applied to thereby realize information management having high cost-utility.

The system includes an ontology definition module (1) for defining ontology that expresses the correspondence relation between terms used in description of the policy and metadata and/or log data, a policy definition module (2) for defining the policy for associating grouping of data resources defined by means of the terms appearing in the defined ontology with the principle of the information management method applied thereto, an information lifecycle management module (3) for deciding the association of the information management method with the definite grouping of data resources with reference to the defined policy, a data resource management module (4) for modifying the management method of data resources on the basis of the grouping of data resources and the information management method decided by the information lifecycle management module, and a service execution control module (5) for managing the correspondence relation of the defined policy and business service operated on the assumption that the policy is formed and stopping the relevant business service when the policy is not formed.

Ontology definition means (11) included in the ontology definition module (1) defines terms (ontology) that expresses the correspondence relation between data resources to be managed and business referring to the data resources and registers the terms in an ontology definition registry (31) included in the information lifecycle management module (3). Further, policy definition means (21) included in the policy definition module (2) defines the policy having "condition part" for grouping the data resources and "command part" applied to the grouped data resources in pairs and registers the defined policy in a policy definition registry (34) included in the information lifecycle management module (3). The ontology definition registry (31) includes two kinds of ontology including a condition part transformation ontology and a command part transformation ontology registered therein and when the policy is defined, the condition part is defined with reference to the condition part transformation ontology registered in the ontology definition registry and the command part is defined with reference to the command part transformation ontology registered in the ontology definition registry.

Further, resource group management means (42) included in the data resource management module (4) includes a list of operations applicable to data resources and metadata/log data acquisition means (41) acquires metadata and/or log data from the data resources managed by the resource group management means (42) in accordance with an instruction from metadata/log data acquisition setting modification means (or metadata/log data management setting modification means or metadata/log data setting modification means) (38) included in the information lifecycle management module (3) and registers the acquired metadata and/or log data in a metadata/log data registry (33) included in the information lifecycle management module (3).

Policy analysis means (35) included in the information lifecycle management module (3) takes out the registered policy from the policy definition registry (34) and transforms the policy into a policy execution plan with reference to the ontology defined in the ontology definition registry (31) to be registered in a policy execution plan registry (36). The policy execution plan decides a data resource group to be operated actually and operation to be applied thereto. At this time, if it is ascertained that the taken-out policy is not executed due to shortage of an area for output of log data or the like, the policy analysis means (35) informs which policy cannot be executed to service execution control means (51) included in the service execution control module (5) to stop business service operated on the assumption that the policy is formed.

The policy execution plan registry (36) included in the information lifecycle management module (3) sends the condition part of the policy execution plan to target resource determining means (32) and the command part thereof to command execution means (37) when the policy execution plan is implemented. The target resource determining means (32) determines a data resource group to be operated in accordance with narrowed-down or refined conditions of data resource designated to the sent condition part while referring to the condition part transformation ontology registered in the ontology definition registry (31) and the metadata/log data registered in the metadata/log data registry (33). The determined data resource group is sent to the command execution means (37), in which proper data management operation is applied to the data resource group in accordance with the already sent command part.

Figure 2:
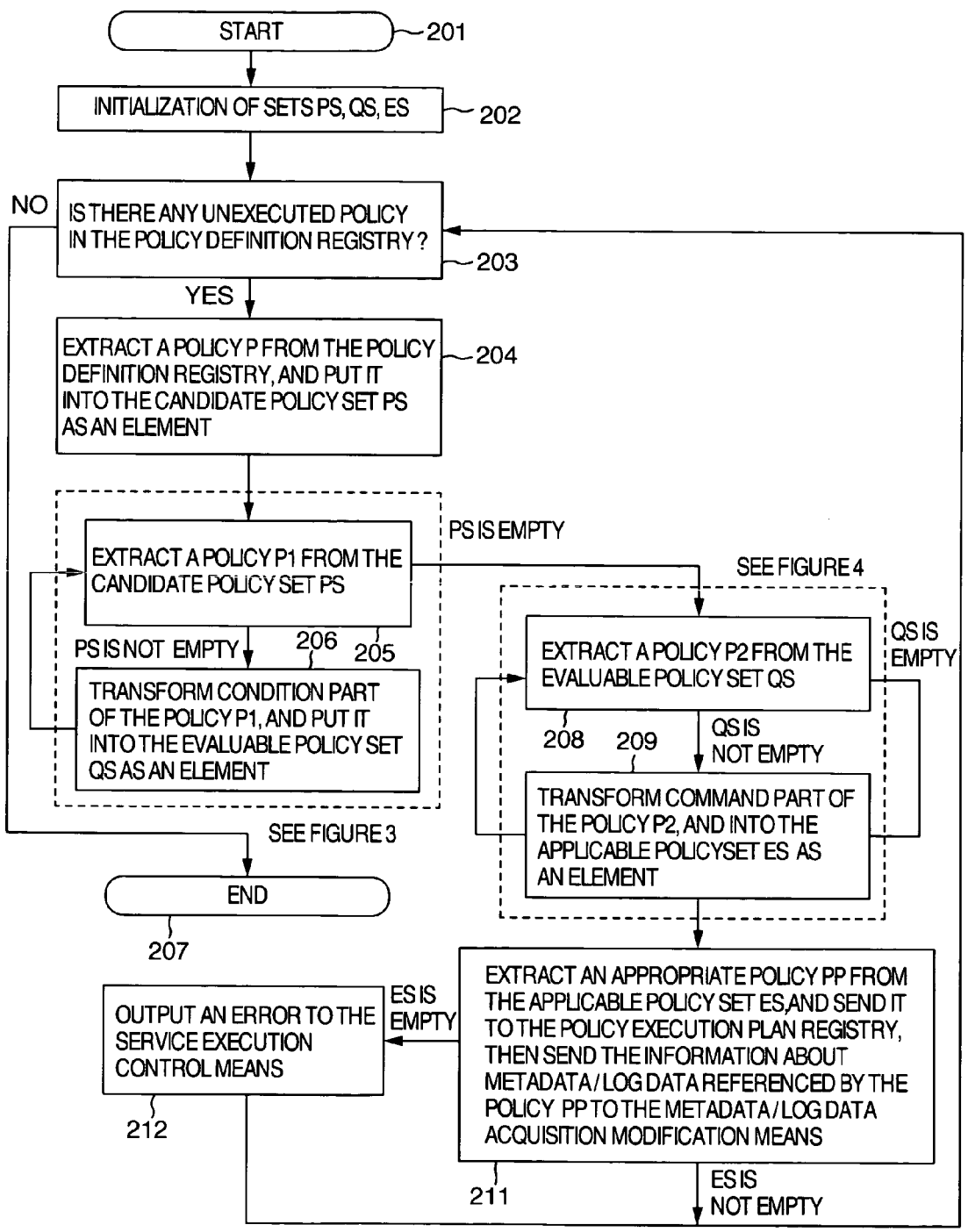
FIG. 2 is a flow chart showing the whole processing of policy analysis means in an embodiment of the present invention.

Referring now to FIG. 2, processing operation of the policy analysis means (35) included in the information lifecycle management module (3) is described.

The policy analysis means (35) first initializes three kinds of policy sets PS, QS and ES (202) and then extracts any unexecuted one of the policies registered in the policy definition registry (203) to register it in the candidate policy set PS as an element (204). When there is no unexecuted policy, the processing is ended (207). Then, a policy P1 is extracted from the candidate policy set PS (205) to judge the evaluability of the condition part of the policy P1. When it is evaluable, the policy P1 is registered in the evaluable policy set QS as an element and when it is not evaluable, the policy P1 is transformed to be registered in the policy set PS again in accordance with the processing flow shown in FIG. 3 (206). When the policy set PS is empty and there is no policy to be extracted, a policy P2 is extracted from the evaluable policy set QS (208) to judge the executability of the command part of the policy P2.

Figure 4:
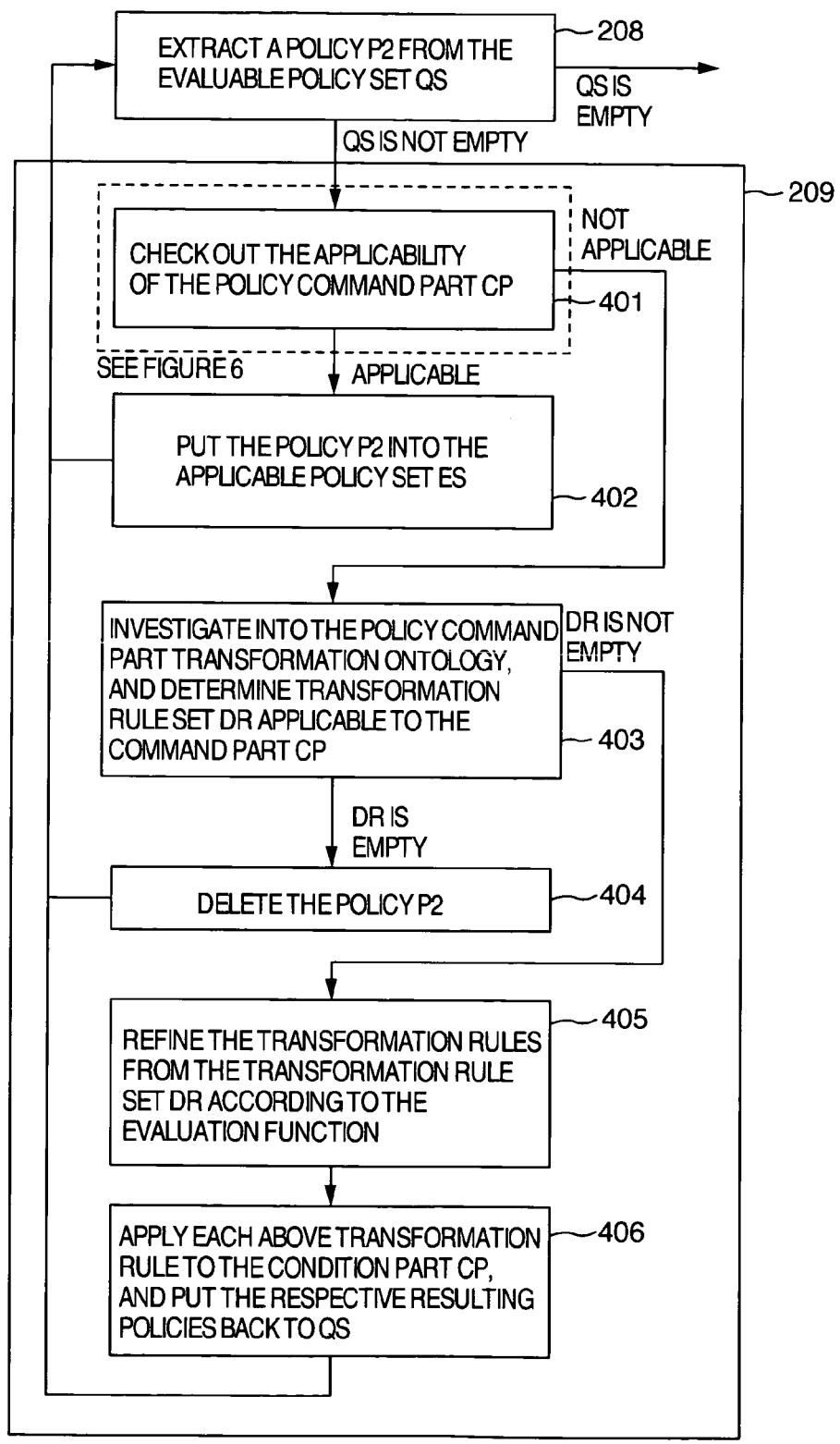
FIG. 4 is a flow chart showing transformation processing of the command and registration processing to policy set ES.

When it is executable, the policy P2 is registered in the executable policy set ES and when it is not evaluable, the policy P2 is transformed to be registered in the policy set QS again in accordance with the processing flow shown in FIG. 4 (209). When the policy set QS is empty and there is no policy to be extracted, a policy PP having a best evaluation value is selected from the executable policy set ES to be sent to the policy execution plan registry. At this time, the policy analysis means further generates reference range information to metadata/log data from the applicable policy PP and sends it to the metadata/log data information acquisition means included in the data resource management module (211). Further, when the executable policy set ES is empty and there is no policy to be extracted, the policy analysis means sends information about the unsuccessful policy P to the service execution control means (212).

Figure 3:
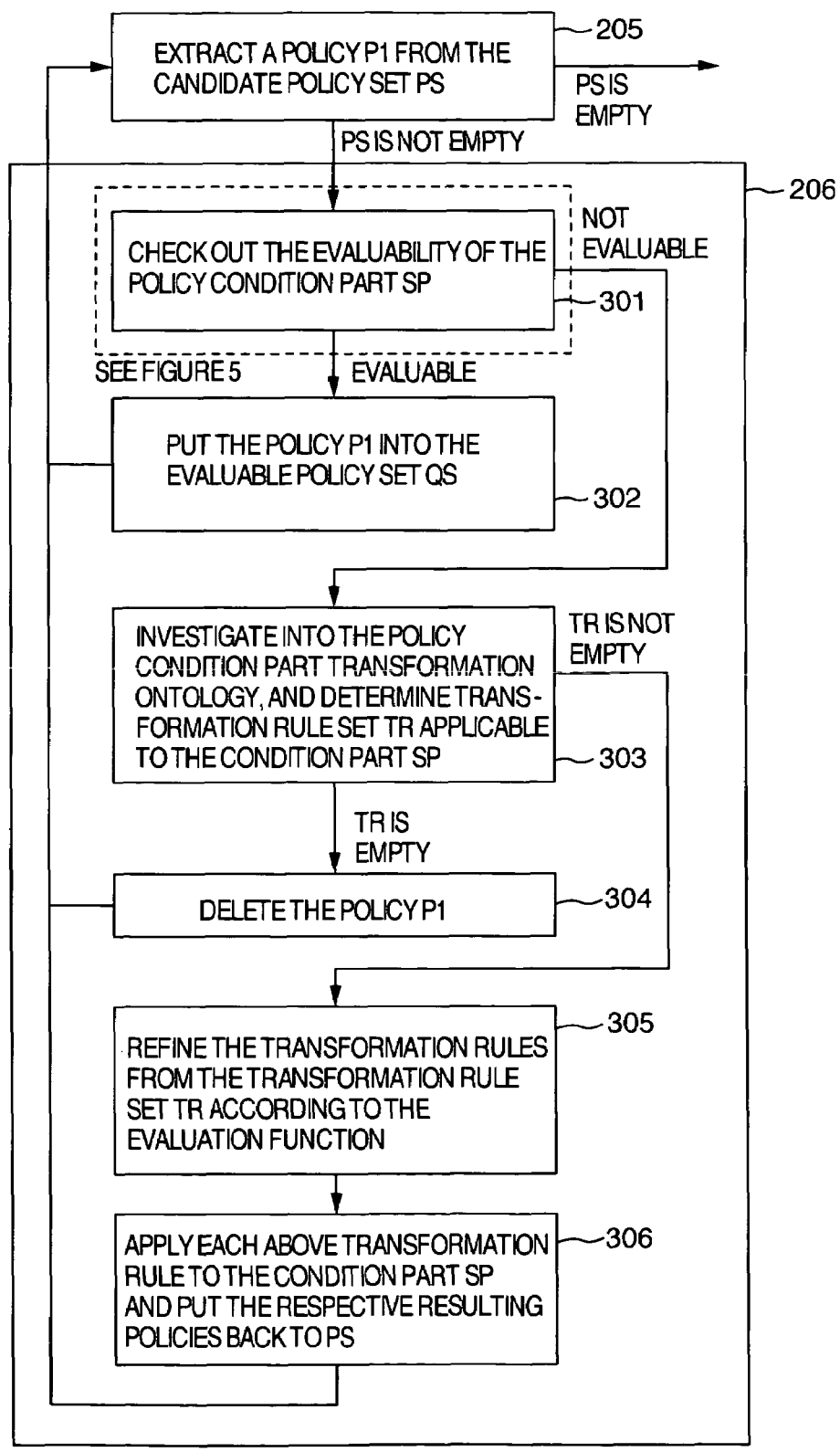
FIG. 3 is a flow chart showing transformation processing of a condition part of the policy and registration processing to policy set QS.

FIG. 3 shows a processing flow for the policy extracted from the policy set PS. The evaluability of the condition part SP of the candidate policy P1 extracted from the candidate policy set PS is judged in accordance with the processing flow shown in FIG. 5 (301). When the condition part SP is in the evaluable state, the policy P is registered in the evaluable policy set QS (302) and when it is not evaluable, the condition part transformation ontology is referred to determine a transformation rule set TR coincident with a predicate pattern appearing in the condition part SP (303). When the set TR is empty, the candidate policy is not evaluable. Accordingly, the candidate policy P1 is deleted (304) and a new candidate policy is studied (205). When the transformation rule set TR is not empty, the transformation rules are applied to the candidate policies and new candidate policies having rewritten condition clauses are registered in the set PS (306). As another embodiment, it is considered that transformation rules to be applied are narrowed down or refined on the basis of evaluation values obtained by applying the evaluation function to transformation rules (305) instead of applying all the applicable transformation rules contained in the transformation rule set TR.

FIG. 4 shows a processing flow for the policy extracted from the policy set QS. The applicability of the command part CP of the evaluable policy P2 extracted from the evaluable policy set QS is judged in accordance with the processing flow shown in FIG. 6 (401). When the command part CP is in the executable state, the policy P2 is registered in the applicable policy set ES (402) and when it is not evaluable, the command part transformation ontology is referred to determine a transformation rule set DR coincident with a command pattern appearing in the command part CP (403). When the set DR is empty, the candidate policy is not applicable. Accordingly, the evaluable policy P2 is deleted (404) and a new candidate policy is studied (208). When the evaluable policy P2 is not empty, the transformation rules are applied to the candidate policies and new candidate policies having rewritten command clauses are registered in the set QS (406). As another embodiment, it is considered that transformation rules to be applied are narrowed down or refined on the basis of evaluation values obtained by applying the evaluation function to transformation rules (305) instead of applying all the applicable transformation rules contained in the transformation rule set DR.

Figure 5:
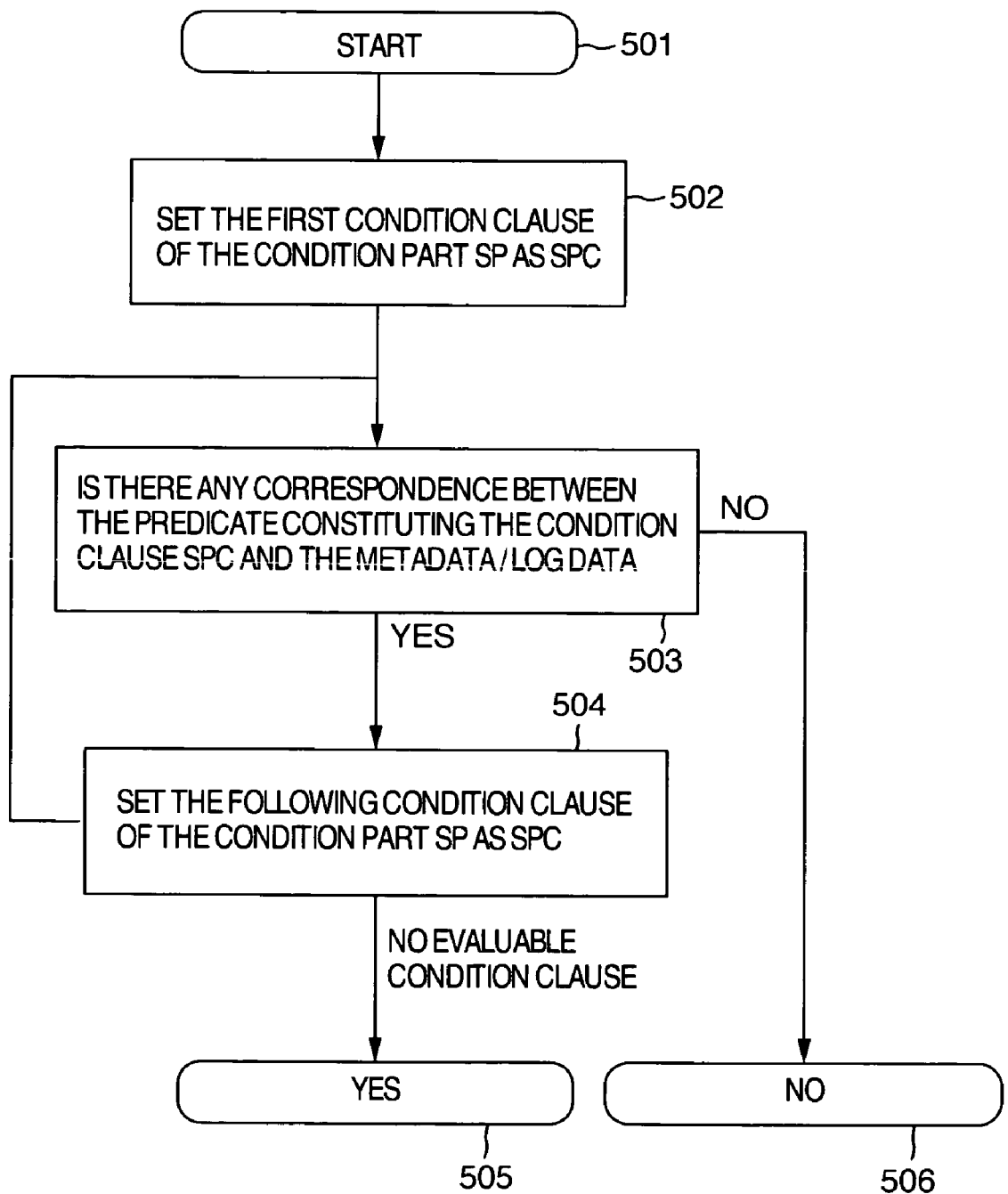
FIG. 5 is a flow chart showing evaluability judgment processing of the condition part of the policy.

FIG. 5 shows a processing flow for judging the evaluability of the policy. In the evaluability judgment processing of the policy, it is judged whether a predicate constituting a first condition clause SPC constituting the condition part SP of the policy (502) is given an evaluable flag in the condition part transformation ontology or not (503). When the evaluable flag is not given, the judgment result that the policy is not yet in the evaluable state is returned (506) and when the evaluable flag is given, the same judgment (503) is made for the following condition clause (504). When the predicates of all the condition clauses constituting the condition part SP are in the evaluable state, the judgment result that all the policies are evaluable is returned (505).

Figure 6:
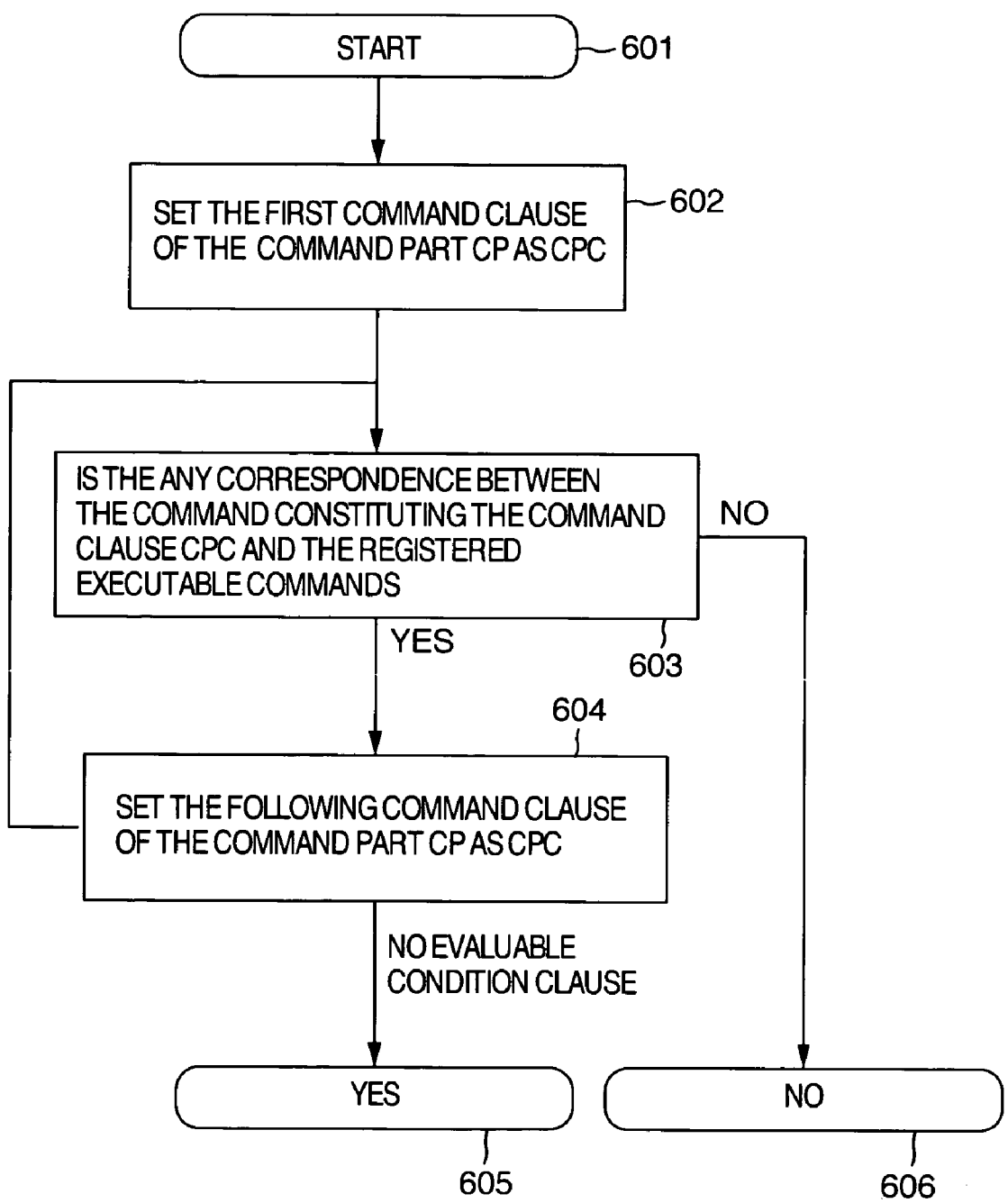
FIG. 6 is a flow chart showing applicability judgment processing of the command part of the policy.

FIG. 6 shows a processing flow for judging the applicability of the policy. In the applicability judgment processing of the policy, it is judged whether a command contained in a first command clause CPC constituting the command part PC of the policy (602) is given an applicable flag in the command part transformation ontology or not (603). When the applicable flag is not given, the judgment result that the policy is not yet in the applicable state is returned (606) and when the applicable flag is given, the same judgment (603) is made for the following command clause (604). When the commands of all the command clauses constituting the command part CP are in the applicable state, the judgement result that all the policies are applicable is returned (605).

Description is now made to the case where the information lifecycle management method of the embodiment is applied to a definite example concerning the security management of business data in a fictitious office information system.

In the definite example, the business data are divided to be stored in some file systems and each business data is assigned an owner. Further, each owner belongs to any business project and a security level is previously set to each business project.

Figure 13A:
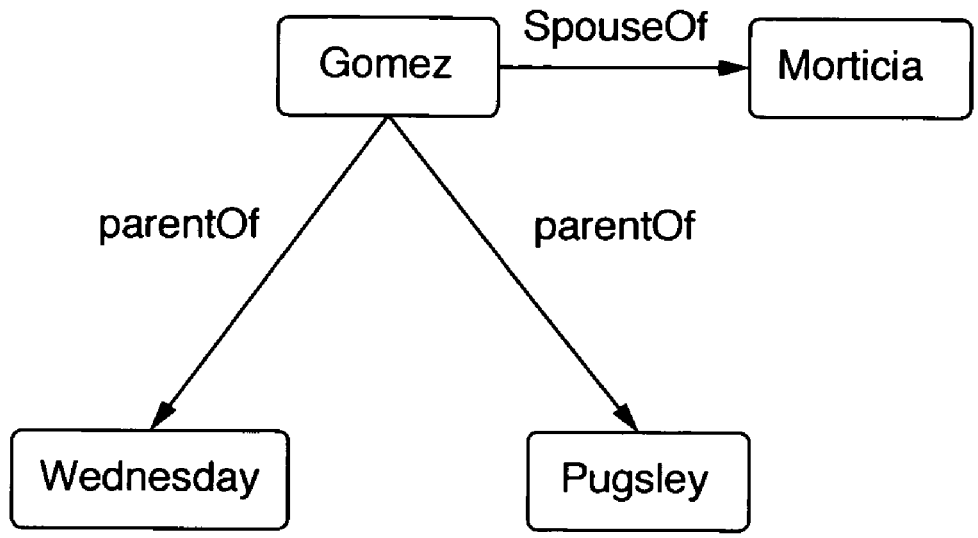
FIGS. 13A and 13B show a fictitious family pedigree and its RDF graph expression, respectively.

FIG. 7 shows the graphic expression of resource description framework (RDF) for file allocation information and project organization information in the definite example. The RDF is to express data having the complicated mutual relation with a set of RDF triples in which three words of subject, predicate and object are combined in order. For example, a fictitious family pedigree shown in FIG. 13A expresses the family having four people of Gomez, Morticia, Wednesday and Pugsley. When this family pedigree is expressed with the RDF, it can be expressed by the following three RDF triples.
(Gomez, spouseOf, Morticia)
(Gomez, parentOf, Wednesday)
(Gomez, parentOf, Pugsley)

Figure 13B:
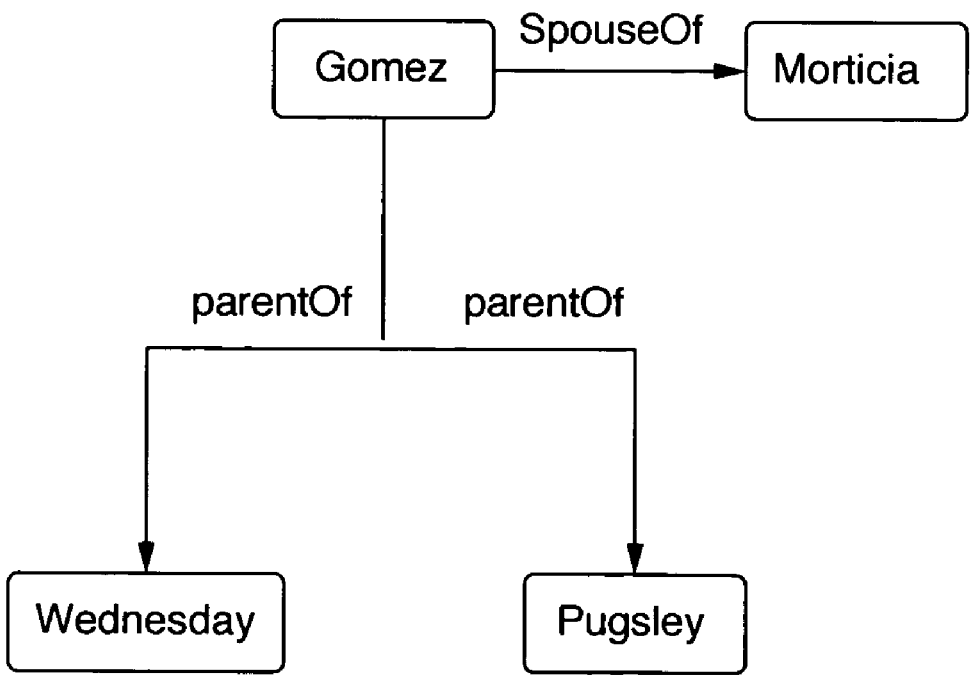

In this graphic expression, the arrow shows a predicate, the root of the arrow shows a subject and the tip of the arrow shows an object. When this family pedigree is expressed graphically, it is as shown in FIG. 13B.

In the definite example, there are two projects having project names of A and B. A member a1 belongs to the project A and members b1 and b2 belong to the project B. At this time, it is supposed that the member a1 owns a file x1 belonging to a file system X and the member b1 owns files y1 and y2 belonging to a file system Y. Further, the project B is designated to be "confidential" as its security level.

This is expressed with RDF as follows:
(A, rdf:type, project), (B, rdf:type, project),
(a1, rdf:type, member), (b1, rdf:type, member), (b2, rdf:type, member),
(x1, rdf:type, file), (y1, rdf:type, file), (y2, rdf:type, file),
(X, rdf:type, file system), (Y, rdf:type, file system),
(a1, ilm:belongsTo, A), (b1, ilm:belongsTo, B), (b2, ilm:belongsTo, B),
(x1, ilm:owns, a1), (y1, ilm:owns, b1), (y2, ilm:owns, b1),
(x1, ilm,belongsTo, X), (y1, ilm:belongsTo, Y), (y2, ilm:belongsTo, Y),
(B. ilm:securitylevel, "confidential")

FIG. 8 shows an example of description of the policy in the definite example. In this example, the condition part of the policy is described in Data Oriented Query Language for RDF Models (RDQL) that is a retrieval language for RDF data and a command script name to be started is described with argument in the command part of the policy.

The RDQL is the retrieval language that searches stored RDF data models for an object matched to the condition to take out it. The retrieval of RDF is realized by the pattern matching of RDF models and a query pattern. For example, when a set of people having the relation of spouse is desired to be obtained from the above example of the family pedigree diagram, resources that are pattern-matched to ?person1 and ?person2 can be obtained by the following query.

RDQL query:SELECT ?person1, ?person2 WHERE (?person1, spouseOf, ?person2)
Retrieval result:{person1=Gomez, person2=Morticia}

The condition part of the policy shown in FIG. 8 instructs to narrow down data resources to those having the security level of the project being "confidential", the type being the file within the data resources belonging to the project and access history within the past one weak being in the data item. The command part of the policy shown in FIG. 8 instructs to modify setting so as to acquire access log to the data resources narrowed down by the condition part.

FIGS. 9A and 9B show the contents of the ontology registered in the definite example. There are two kinds of ontology including condition part transformation ontology shown in FIG. 9A and command part transformation ontology shown in FIG. 9B. In the definite example, three sets of condition part transformation ontology and one set of command part transformation ontology are defined. The first ontology of the condition part transformation ontology shown in FIG. 9A shows that "the data resource belonging to (ilm:belongsTo) the project" appearing in the condition part of the policy can be transformed into "the data resource owned by (ilm:owns) the member belonging to (ilm:belongsTo) the project".

The second ontology shows that "the member belonging to (ilm:belongsTo) the project" can be transformed into "the member constituting (meta:memberOf) the project". The third ontology shows that "the data resource owned by (ilm:owns) the member" can be transformed into "the data resource that the member is an owner (meta:owner)".

Further, the first ontology of the command part transformation ontology shown in FIG. 9B shows that "the command for instructing to acquire access log to data resource having data type of file" can be transformed into "the command for instructing to acquire access log to a file system which the data resource is descendant of (meta:decendantOf)".

FIGS. 10A-10C show a list of evaluable predicates and a list of applicable commands in the embodiment. With regard to the file allocation information, the owner information (meta:owner) of data resource, the belonging relation (meta:decendantOf) of data resource to the file system and access history information (meta:accesshistory, meta:accesstime) to the file are registered as evaluable metadata, as shown in FIG. 10A. With the project organization information, the security level (meta:securityLevel) of the project and the belonging relation (meta:memberOf) of the member to the project are registered as evaluable metadata, as shown in FIG. 10B. Further, in the embodiment, it is supposed that as the applicable command the acquisition command of access log to the file system is registered as the executable command, as shown in FIG. 10C. However, the predicate rdf:type indicative of the classification of resource is always regarded as evaluable predicate.

Further, metadata for the file allocation information and metadata for the project orgnization information in the definite example are as shown in FIGS. 11A and 11B and 12A and 12B, respectively.

At this time, the policy analysis means first registers the policy shown in FIG. 8 registered in the policy definition registry in the candidate policy set PS and then takes out the registered policy from the candidate policy set PS as policy P1.

[Policy P1]

<Condition Part>
SELECT ?dataitem
WHERE
(?project, meta:securityLevel, "confidential"),
(?dataitem, ilm:belongsTo, ?project),
(?dataitem, rdf:type, "file"),
(?dataitem, meta:accesshistory, ?acclog),
(?acclog, meta:accesstime, ?acctime)
AND
?acctime > TODAY 1WEEK
USING ilm FOR <http://ilm/ontology.rdf#>
<Command Part>
Set accesslog On dataitem In judgment of the evaluability of the policy, when the second condition clause (?dataitem, ilm:belongsTo, ?project) of the policy is referred to, the predicate ilm:belongsTo constituting the condition clause is not registered as the evaluable predicate and accordingly the condition part transformation ontology #1 is acquired as the transformation rule set TR applicable to the condition part with reference to the condition part transformation ontology. When the condition part transformation ontology #1 is applied to the policy P1, the following policy P11 is acquired.

[Policy P11]

<Condition Part>
SELECT ?dataitem
WHERE
(?project, meta:securityLevel, "confidential"),
(?member, ilm:belongsTo, ?project),
(?dataitem, ilm:owns, ?member)
(?dataitem, rdf:type, "file"),
(?dataitem, meta:accesshistory, ?acclog),
(?acclog, meta:accesstime, ?acctime)
AND
?acctime > TODAY 1WEEK
USING ilm FOR <http://ilm/ontology.rdf#>
<Command Part>
Set accesslog On dataitem In judgment of the evaluability of the policy, since the predicates constituting the second and third condition clauses of the policy are not registered as the evaluable predicate, the condition part transformation ontologies #2 and #3 are acquired as the transformation rule applicable to the policy P11. The ontologies are successively applied to the policy P11 to thereby acquire the following policy P12.

[Policy P12]

<Condition Part>
SELECT ?dataitem
WHERE
(?project, meta:securityLevel, "confidential"),
(?member, meta:memberOf, ?project),
(?dataitem, meta:owner, ?member)
(?dataitem, rdf:type, "file"),
(?dataitem, meta:accesshistory, ?acclog),
(?acclog, meta:accesstime, ?acctime)
AND
?acctime > TODAY 1WEEK
USING ilm FOR <http://ilm/ontology.rdf#>
<Command Part>
Set accesslog On dataitem With regard to the policy P12, since the predicates of all the condition clauses constituting the policy are evaluable, the policy is registered in the evaluable policy set QS.

Further, the policy P12 registered in the evaluable policy set QS is taken out as the policy P2. When the applicability of the policy P2 is judged, the acquisition command of the access log to the file described in the command part of the policy P2 is not registered as being executable and accordingly the command part transformation ontology #1 is acquired as the transformation rule set DR applicable to the command part with reference to the command part transformation ontology. When the command part transformation ontology #1 is applied to the policy P2, the following policy P21 is acquired.

[Policy P21]

<Condition Part>
SELECT ?filesystem
WHERE
(?project, meta:securityLevel, "confidential"),
(?member, meta:memberOf, ?project),
(?dataitem, meta:owner, ?member)
(?filesystem, rdf:type, "filesystem"),
(?dataitem, meta:decendantOf, ?filesystem)
(?dataitem, meta:accesshistory, ?acclog),
(?acclog, meta:accesstime, ?acctime)
AND
?acctime > TODAY 1WEEK
USING ilm FOR <http://ilm/ontology.rdf#>
<Command Part>
Set accesslog On filesystem The policy P21 acquired as the result of the transformation has the command part that is applicable to the embodiment and accordingly this policy is registered in the applicable policy set ES.

As a result of the above operation, since only the policy P21 is registered in the evaluable policy set, the policy is sent to the policy execution plan registry. Further, at this time, the policy analysis means prepares a list as described below as the reference range information of metadata/log data referred by the applicable policy P21 and sends it to the metadata/log data acquisition means included in the data resource management module.

(?project, meta:securityLevel, "confidential"),
(?member, meta:memberOf, ?project),
(?dataitem, meta:owner, ?member),
(?filesystem, rdf:type, "filesystem"),
(?dataitem, meta:decendantOf, ?filesystem),
(?dataitem,meta:accesshistory, ?acclog),
(?acclog, meta:accesstime,?acctime)
?acctime > TODAY 1WEEK The metadata/log data acquisition means instructs the resource group management means to modify setting so as to collect the metadata/log data (meta:securityLevel, meta:memberOf, meta:owner, meta:decendantOf, meta:accesshistory, meta:accesstime) in the list with reference to the list of metadata/log data received. Further, since the log data (ilm:accesstime) concerning the access history has the referred access history range being within the past one week, the holding time of log data is set to be the past one week.

At this time, if the applicable policy set is empty and any applicable policy is not produced from the policy taken out from the policy registry, the policy is sent as the inapplicable policy to the service execution control means included in the service execution control module. When the service is registered on the assumption that the inapplicable policy is operated, the service execution control means stops the service.

The condition part of the policy sent to the policy execution plan registry is sent to the target resource determining means and the command part thereof is sent to the command execution means. The target resource determining means interprets RDQL contained in the sent condition part to narrow down data resources to be operated. In the embodiment, the file system Y is selected as the target resource. The selected data resource is sent to the command execution means and applied to the data resource that selects the command described in the command part sent as above and setting is modified so that the file system Y acquires the access log.

According to the present invention, the information management system can easily modify the conditions of acquisition, retention and abandonment of information as the value in business of the data to be managed is temporally varied due to change of the business strategy and/or the business model in a series of lifecycle from generation to abandonment of the data and accordingly the applicability thereof in this field is increased.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information management system, in which a data management strategy applied to each data resource of data resources is decided in accordance with a previously defined policy with reference to at least one of metadata and access log data accompanying the data resources, and in which each data resource of the data resources is managed in accordance with the data management strategy, said information management system comprising:
   ontology definition means for defining ontology expressing relation between terms utilized in description of the policy and the metadata, access log data accompanying the data resources, and relation between terms utilized in description of the policy and data management command;
   policy definition means for defining the policy with reference to the ontology defined by said ontology definition means,
   wherein the policy includes a definition for associating data management strategy with the data resources;
   policy analysis means for analyzing definition contents of the policy and for instructing a management method of at least one of the metadata and access log data based on a result of analyzing;
   modification means for modifying setting about a management method of metadata and/or access log data of the data resources in accordance with an instruction form the policy analysis means;
   metadata/log data acquisition means for acquiring at least one of metadata and access log data accompanying with the data resources in accordance with the setting modified by said modification means; and
   command execution means for defining the data management strategy based on the policy defined by said policy definition means with reference to at least one of the metadata and access log data acquired by said metadata/log data acquisition means.

2. An information management system according to claim 1, wherein the policy analysis means refers to the ontology when the policy analysis means analyzes the definition contents of the policy.

3. An information management system according to claim 2, wherein the policy analysis means includes means for specifying at least one of an item of metadata and access log data referred in the defined policy and means for instructing the modification means to acquire metadata/log data for the item specified by the means for specifying.

4. An information management system according to claim 2, wherein the policy analysis means includes means for specifying a range of at least one of metadata and access log data referred in the defined policy and means for instructing the modification means to acquire at least one of metadata and access log data from the range specified by the means for specifying.

5. An information management system according to claim 2, wherein the policy analysis means includes means for specifying a range of at least one of metadata and access log data referred in the defined policy and means for instructing the modification means to delete at least one of metadata and access log data deviated from the specified range.

6. An information management system according to claim 2, wherein the ontology defined by the ontology definition means includes a definition of a range of at least one of metadata and access log data that can be referred in the information management system, and
   wherein the policy analysis means includes means for detecting that the policy cannot be judged when contents of at least one of metadata and access log data referred in the defined policy are deviated from the range defined in the ontology.

7. An information management system according to claim 2, wherein the ontology defined by the ontology definition means includes a definition of a range of commands concerning data management applicable in the information management system, and
   wherein the policy analysis means includes means for detecting that the policy cannot be applied when contents of the commands concerning data management designated in the defined policy are deviated from the range defined in the ontology.

8. An information management system according to claim 6, wherein the policy contains description concerning an error command executed when the policy is not evaluated, and
   wherein the policy analysis means includes means for instructing to execute the error command described in the policy when the means for detecting that the policy cannot be judged.

9. An information management system according to claim 6, further comprising:
   service execution control means holding dependence relation between the previously defined policy and services referring to the data resources, and for stopping service depending on a policy that is detected as the policy that cannot be judged by the means for detecting.

10. An information management system according to claim 7, wherein the policy contains description concerning an error command executed when the policy is not applied, and
   wherein the policy analysis means includes means for instructing to execute the error command described in the policy when the means for detecting that the policy cannot be applied.

11. An information management system according to claim 7, further comprising:

service execution control means holding dependence relation between the previously defined policy and services referring to the data resources, and for stopping a service depending on a policy that is detected as the policy that cannot be applied by the means for detecting.

12. An information management system according to claim 2, wherein the ontology includes a definition of a range of items of at least one of metadata and access log data that can be referred in the information management system, and wherein the policy analysis means includes means for transforming definition contents of the policy so that the policy can be evaluated in the information management system based on the definition of the range in the ontology.

13. An information management system according to claim 12, wherein the policy analysis means includes means for specifying a range of at least one of metadata and access log data referred in the transformed policy and means for instructing the modification means to acquire at least one of metadata and access log data from the range specified by the means for specifying.

14. An information management system according to claim 2, wherein the ontology includes a definition of a range of data management commands that can be applied to the information management system, and wherein the policy analysis means includes means for transforming definition contents of the policy so that the policy can be applied to the information management system based on definition of the range in the ontology.

15. An information management system according to claim 14, wherein the policy analysis means includes means for specifying a range of at least one of metadata and access log data referred in the policy transformed by the means for transforming, and means for instructing the modification means to acquire at least one of metadata and access log data from the range specified by the means for specifying.

16. An information management system according to claim 2, wherein the policy analysis means provides an ontology definition interface for creating or modifying the definition of the ontology.

* * * * *